(12) United States Patent
Virtanen et al.

(10) Patent No.: US 11,351,571 B2
(45) Date of Patent: *Jun. 7, 2022

(54) FAST COATING COMPOSITIONS

(71) Applicant: TESLA NANOCOATiNGS, INC., Massillon, OH (US)

(72) Inventors: Jorma Virtanen, Massillon, OH (US); Joshua Armstrong, Cuyahoga Falls, OH (US); Todd Hawkins, Massillon, OH (US)

(73) Assignee: TESLA NANOCOATINGS, INC., Massillon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,603

(22) Filed: May 10, 2021

(65) Prior Publication Data

US 2021/0283654 A1 Sep. 16, 2021

Related U.S. Application Data

(60) Division of application No. 17/077,741, filed on Oct. 22, 2020, which is a continuation of application No. 16/814,385, filed on Mar. 10, 2020.

(51) Int. Cl.
*B05D 7/00* (2006.01)
*C09D 5/08* (2006.01)
(Continued)

(52) U.S. Cl.
CPC ............... *B05D 7/532* (2013.01); *C08K 3/04* (2013.01); *C08K 3/40* (2013.01); *C09D 5/08* (2013.01);
(Continued)

(58) Field of Classification Search
CPC ............ B05D 7/532; B05D 2301/00; B05D 2401/10; B05D 2503/00; B05D 2504/00;
(Continued)

(56) References Cited

U.S. PATENT DOCUMENTS 9,193,886 B2 11/2015 Soucek
9,725,603 B2 8/2017 Virtanen
(Continued)

FOREIGN PATENT DOCUMENTS

WO 2019155207 A1 8/2019

OTHER PUBLICATIONS

Abbasian, et al., "Resin Migration Tracking via Real-Time Monitoring FTIR-ATR in a Self-Stratifying System," Progress in Organic Coatings 131, 2019-159-164.
(Continued)

*Primary Examiner* — Robert S Walters, Jr.
(74) *Attorney, Agent, or Firm* — Emerson Thomson Bennett; Daniel A. Thomson

(57) ABSTRACT

An anticorrosive coating includes a first curable liquid layer to the associated substrate, the first layer having a thickness of at least about 100 micrometers, wherein the first layer includes at least one polymer or at least one monomer, quasi-one-dimensional particles or quasi-two-dimensional particles, sacrificial metal particles, and a solvent, wherein a percolation threshold of the particles is not reached in the presence of the solvent, wherein the percolation threshold of the particles is reached when between about 1% and about 20% of the solvent evaporates, applying a second curable liquid layer having a thickness of at least 100 micrometers on the top of the first layer after the percolation threshold of the particles is reached and viscosity of the first layer increases more than 50%, and allowing the first layer and the second layer to cure simultaneously.

15 Claims, 4 Drawing Sheets

(51) Int. Cl.
  *C09D 7/62* (2018.01)
  *C09D 7/40* (2018.01)
  *C08K 3/40* (2006.01)
  *C08K 3/04* (2006.01)

(52) U.S. Cl.
  CPC .............. *C09D 7/62* (2018.01); *C09D 7/70* (2018.01); *B05D 2301/00* (2013.01); *B05D 2401/10* (2013.01); *B05D 2503/00* (2013.01); *B05D 2504/00* (2013.01)

(58) Field of Classification Search
  CPC ... C09D 7/70; C09D 7/62; C09D 5/08; C08K 3/04; C08K 3/40
  See application file for complete search history.

(56) References Cited

U.S. PATENT DOCUMENTS

| | | |
|---|---|---|
| 2002/0146514 A1 | 10/2002 | Chung |
| 2007/0267134 A1 | 11/2007 | Konarski |
| 2012/0052307 A1 | 3/2012 | Plieth |
| 2018/0142103 A1 | 5/2018 | Beaudry |

OTHER PUBLICATIONS

Beaugendre, et al., "Self-Stratifying Epoxy/Silicone Coatings," Progress in Organic Coatings 103, 2017, 101-110.

Joo, et al., "Corrosion Resistance of Self-Stratifying Coatings using Fluorovinyl Ether/BPA Epoxide," Progress in Organic Coatings 133, 2019, 145-153.

Abstract of Salata, et al., "Migration of Fluorinated Alkyd and Fluorinated Tung Oil Additives for Partially Self-Stratifying Coatings," Progress in Organic Coatings 133, 2019, 406-417.

Tesla Nanocoatings, Inc., Tesla NanoCoatings Named Among 50 Smartest Companies of the Year by The Silicon Review Magazine, pp. 1-3, Sep. 26, 2018.

Tesla Nanocoatings, Eslan 1101 (ISO 12944-9) Zn-CNT Low VOC Epoxy Primer, pp. 1-3, Jul. 16, 2019.

Coatingspro Magazine, "2×1 Wet Edge(TM) Surpasses ISO 20340 Testing," pp. 1-5, available online Apr. 19, 2016.

Salata, et al., "Migration of Fluorinated Alkyd and Fluorinated Tung Oil Additives for Partially Self-Stratifying Coatings," Progress in Organic Coatings 133, 2019, 406-417.

Search Report for PCT/US2021/021512 dated Jun. 28, 2021.
Written Opinion for PCT/US2021/021512 dated Jun. 28, 2021.

FAST COATING COMPOSITIONS

This application is a divisional application of U.S. Ser. No. 17/077,741, entitled Fast Coating Compositions and Methods, filed Oct. 22, 2020; which is a continuation application of U.S. Ser. No. 16/814,385, entitled Fast Coating Compositions and Methods, filed Mar. 10, 2020. Anticorrosive coatings often contain several layers. One of the most commonly used industrial coatings is a three-layer coating consisting of zinc rich primer, an intermediate layer, and a topcoat. Currently, two-layer, and up to five-layer, coatings are also being used.

BACKGROUND

Typically, the primer is applied to the substrate, and allowed to partially cure, often so that the primer appears to be dry and can be touched. Then the process is repeated, until all the layers have been applied. This method may be called wet-on-dry (WoD) method. This often means that one layer per day may be applied. Spraying is the most commonly favored application method for WoD.

Wet-on-wet (WoW) is a technique in which wet layers are applied to previously administered wet layers. Due to the consistency, most wet uncured coatings cannot have a second wet layer sprayed on top of them; especially for a vertical surface. There are many problems associated with the WoW method. First, sagging may be extensive. Sagging is often a problem with a single layer, and is exponentially more difficult if another wet layer is added on an existing wet layer. The velocity of the spray creates significant momentum toward the substrate, which may lead to partial penetration of the previous wet layer. This can create serious problems if two different types of polymer systems, such as epoxies and polyurethanes, are used in consecutive layers. There may be a chemical problem if two different epoxies are used, because the stoichiometry may be too different. The same issue applies to polyurethanes. The problem is more pronounced if layers have different polymerization chemistries, such as amino-cured epoxies and polyurethanes. Di-isocyanates in the polyurethane layer may react extensively with the amines in the epoxy layer. Although a moderate cross reaction between the layers is desirable, because adhesion between the layers is increased, excessive reaction might distort the stoichiometry so much that the polymerization will be incomplete in both layers.

Wet on wet coating has been used, for example, in the fabrication of photographic films. However, in that case the film is horizontal and moves horizontally. The momentum of the liquid in that case is almost parallel to the film, thereby reducing the mixing of the layers.

Wet on wet coating has also been used for the coating of cars (e.g. US20040028822, Continuous process for applying a tri-coat finish on a vehicle). The application is directed to a process and materials for coating a substrate with a flake or other effect pigment containing tri-coat color finish in a continuous wet-on-wet application process. In water, hydrogen bonding is very important. When water evaporates, even partially, hydrogen bonding between constituents increases the viscosity.

Despite the significant success in the car industry, the WoW method has not been applied in field conditions, and especially not in oil and gas fields. First, cars already have an anticorrosive dry coating before they enter the final painting stage. Thus, the anticorrosive coating does not get diluted with the subsequent layers. In oil and gas fields, and many other instances, the anticorrosive coating is the primer. Any dilution of the primer may be detrimental to its performance. This applies to anticorrosive coatings that have sacrificial metal particles. These must be in electrical contact with each other and the substrate. Second, the thickness of the layers is typically more than 100 µm. Putting two wet layers on top of each other may result in considerable sagging. While it is aesthetically undesirable, it also gives uneven coating and performance.

Liquid coating materials should have a low enough viscosity so that they can be sprayed, brushed, or otherwise readily applied. On the other hand, the viscosity should be high enough that there is no sagging on vertical surfaces. The suitable viscosity application range is between about 1000 cP (centipoise) and about 2500 cP, but can be between about 1500 cP and about 2000 cP. Sagging may be prevented by making the coating thin enough, and letting it dry before the next layer is applied. This may make the whole coating process slow and expensive. Thixotropic additives may be used to increase the viscosity. These additives are beneficial, but they have limits, and do not allow for the WoW method of the present teachings.

Conventional coating methods have several drawbacks. Despite the correct stoichiometry and proper mixing, one or more components may partially separate, and be squeezed out from the interior of the coating layer. This may be harmful to the adhesion with the substrate and adhesion between the layers. When the curing agent is an amine, this phenomenon is called amine blush. The amine will further absorb water and carbon dioxide on to the surface, leading to amine bloom that is more extensive than amine blush. All this will have a negative effect on the binding of the next layer, and on the overall performance of the coating. All these problems may be alleviated by the present teachings. First, there is no time for the curing induced separation of the components. Consequently, there will not be any significant absorption of water and carbon dioxide. Second, because there is a thin mixing layer, and the layers are cured at the same time, the polymer will be continuous without any interface, i.e., there may be a high density of intermingled polymer chains connecting two consecutive layers. In conventional methods there will also be some bonding between layers, but the density is low, if polymerization has been mostly completed. Amine blush or bloom worsens the situation when conventional coating methods are used. Excess amine acts as a polymerization terminator for epoxies and polyurethanes, preventing chemical bonding between the layers.

Evonik developed a method utilizing a new curing agent that will increase the viscosity quickly. The drawbacks are a short pot life and the use of a plural spray system. The present teachings alleviate both of these drawbacks.

SUMMARY

The present teachings use the concept of a percolation threshold to adjust the viscosity of the liquid coating, so the mixing of the layers and sagging is minimized. Percolation traditionally means filtering fluids through porous materials. However, in materials science and physical chemistry it also means a continuous pathway along a material. Percolation threshold is a concentration of particles in a medium, in which the particles are continuously touching each other so that they form a continuous network. If these particles are electrically conducting, and the medium is not, a sudden increase of conductivity, as a function of the concentration of particles, indicates the percolation threshold. Other physical properties may also change abruptly when the percolation threshold is reached. Viscosity may be a sensitive indicator of the percolation threshold.

Percolation depends strongly on the shape of the particles. Spherical particles have a high percolation threshold, about 30 vol %. It is to be understood that "spherical" is to be understood as an approximate shape, and not an exact geometric sphere. A high aspect ratio lowers the percolation threshold dramatically. Quasi-one-dimensional particles, such as CNTs (carbon nanotubes), may have a percolation threshold under 1 vol %. Platelets, such as graphene, may have a percolation threshold under 10 vol %. When a liquid contains spherical, quasi-two-dimensional, and quasi-one-dimensional, particles, as is often the case in the materials of the present teachings, the percolation threshold is found by experimentation. For example, 30 vol % of zinc particles is about 75 wt %, because zinc has a density of about 7 g/cm$^3$. Thus, current zone rich primers have about 80 wt % of zinc, because zinc to zinc contact is useful for an anticorrosive function.

The present teachings avoid the problems of coating vertical stationary substrates, by adding quasi-one-dimensional, and quasi-two-dimensional, particles, such as carbon nanotubes (CNTs), graphene, zinc flakes, or glass flakes into the coating. These particles have a low percolation threshold, such that the viscosity increases suddenly when the percolation threshold is reached, for example, due to evaporation of a solvent. CNTs may be single walled (SWNT), double walled (DWNT), or multiwalled carbon nanotubes (MWNT). Graphene may be single layer or multilayer graphene. Also, fast evaporating solvents, such as t-butyl acetate, may be used. After the solvent has evaporated the viscosity of the coating material is immediately very high, resembling partially cured conventional coating materials. Extensive mixing of the layers may further be avoided by a proper choice of components. One layer may consist primarily of aliphatic compound, while the other may consist mostly of aromatic compounds. One layer may also contain fluorinated compounds.

Epoxy-amine systems, especially at low temperatures and humid environments, have serious problems called amine blush and amine bloom. During, and immediately after, the curing process the surface may become contaminated by excess amine, water, and/or carbon dioxide. Sometimes the freshly cured surface must be washed and sanded, otherwise the adhesion of the next layer may be adversely affected. Both amine blush and amine bloom can be avoided by the present teachings on the primer and intermediate layers (i.e., in all layers that are important for the anticorrosive properties).

These additives and compositions allow application of a second wet layer on top of the first wet layer, i.e., enabling the WoW method. The two-layer coating of the present teachings competes favorably with conventional three-layer coatings in anticorrosive properties. Moreover, it can be applied in one day, while application of the three-coat system may take three days. Thus, the present teachings provide materials and methods that can give considerable economic benefit.

The present teachings provide materials and methods for the fast coating of surfaces by two or more different liquid layers that can be cured at the same time.

In one aspect of the present teachings, the surface is coated with a first wet coating material that contains quasi-one-dimensional particles or quasi-two-dimensional particles, and then with a second wet coating material before the first wet coating material is cured.

In one aspect of the present teachings, the method may be used in oil or gas fields for the coating of equipment, such as oil rigs and pipes.

Another aspect of the present teachings is providing materials and methods that avoid amine blush and bloom in the primer and all intermediate layers, especially in humid conditions, such as off-shore environments.

Other benefits and advantages will become apparent to those skilled in the art to which it pertains upon reading and understanding of the following detailed specification.

DEFINITIONS

WoD (wet on dry)—a liquid layer applied on top of a dry layer.

WoW (wet on wet)—a liquid layer applied on top of a wet layer.

Quasi one-dimensional—one dimension of a particle is at least 50 times larger than the other two dimensions. For example, if MWNT has a diameter of 10 nm, and is more than 500 nm long, it is classified as quasi one-dimensional in this context. For simplicity, these particles are called one-dimensional in the Description.

Quasi two-dimensional—two dimensions of a particle are at least 50 times larger than one dimension. For example, if a glass flake has a thickness of 1 μm and is more than 50 μm wide in two dimensions, it is classified as quasi two-dimensional in this context. For simplicity, these particles are called two-dimensional in the Description.

Percolation threshold—the concentration of particles, wherein the particles form a continuous three-dimensional network. The measure in this context of the percolation threshold is viscosity, i.e., viscosity will increase significantly after percolation threshold is reached. This definition may give higher percolation threshold for some particles than other methods, for example, CNTs electrical conductivity may indicate that CNTs reach percolation threshold at very low concentrations, below 0.1%, while the viscosity stays very low. Also in the present teachings, many different kinds of particles may participate in percolation network.

Curable liquid—a polymer solution or melt that solidifies when a solvent evaporates or temperature is ambient; or a monomer, or monomer mixture, that solidifies as a result of a polymerization reaction.

Wet coating layer—a wet layer whose thickness can be measured with a standard wet thickness contact gauge.

FIGURES

The present teachings are described hereinafter with reference to the accompanying drawings.

DETAILED DESCRIPTION

Figure 1:
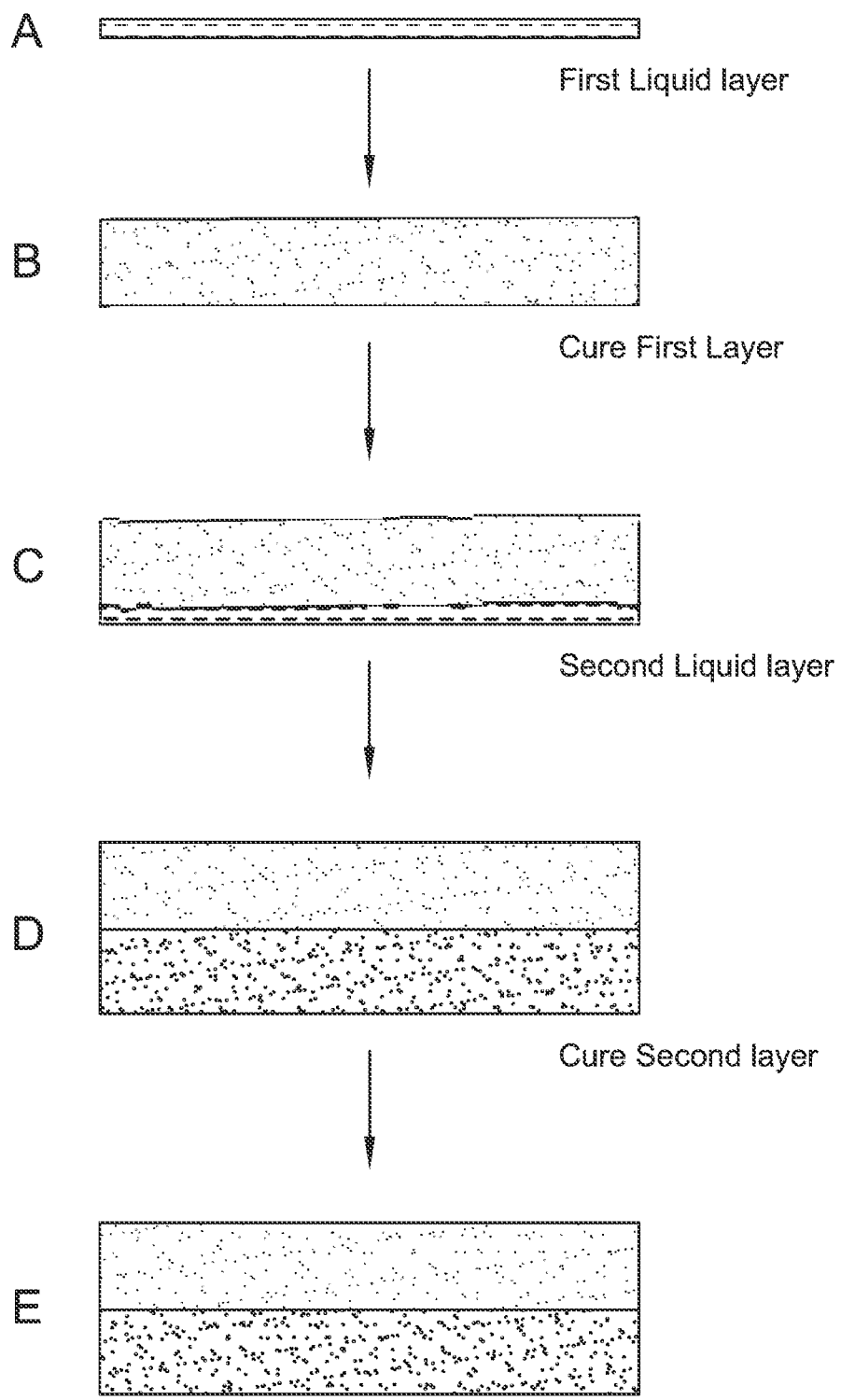
FIG. 1 shows a conventional two-coat method, wherein A is the substrate, B is the first layer applied to the substrate, C is the first layer cured, D is the second layer applied on the substrate, and E is the second layer cured.

FIG. 1 depicts a method for the fabrication of a conventional two-coat system (WoD), in which the first layer is cured before a second layer is applied. Often the first layer must be washed, and sanded before the second layer is applied, even if it freshly cured. This step is not included in FIG. 1, because it is not always mandatory.

Figure 2:
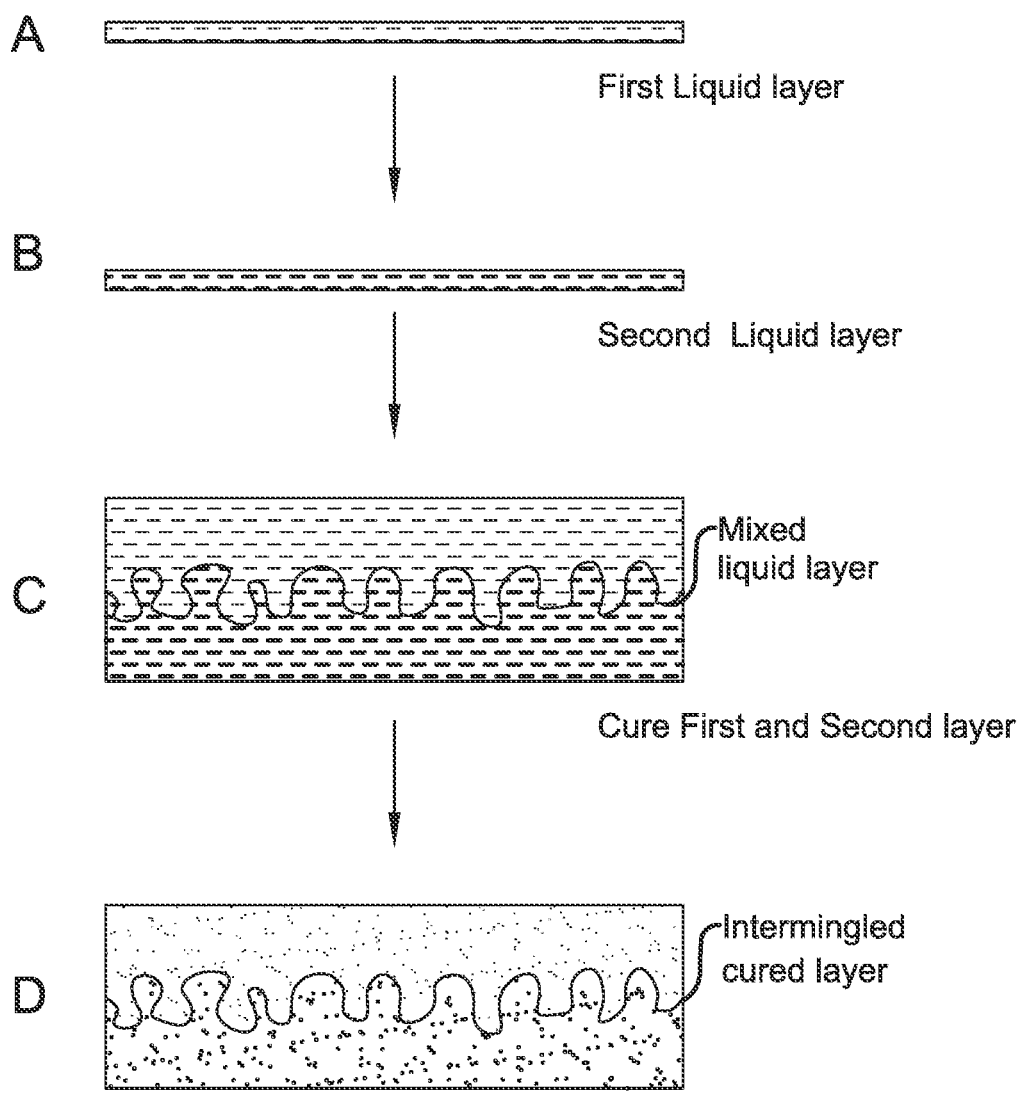
FIG. 2 shows the two-coat method of the present teachings, wherein A is the substrate, B is the first layer applied to the substrate, C is the second layer applied to the substrate, and D is the first and second layer cured.

FIG. 2 depicts the method of the present teachings (WoW). The first layer is applied, and before the first layer is cured, the second layer is applied. Thus, there is at least one less step. Also, no washing or sanding of the first layer is done in this method. Thus, there may be two steps less than in the conventional method of FIG. 1. These extra steps included in the conventional method are slow, and often only one layer can be applied in one day.

Conventional coating systems have three layers, while the present teachings may provide equal or better performance with just two layers. Conventional coating may take up to three days, while the coating according to present teachings may be performed in one day. The materials and methods of the present teachings offer considerable savings, and equal or better performance compared to the conventional coating materials and methods.

Coating compositions of the present teachings may contain polymer or monomer(s), thixotropic agent, sacrificial metal particles, solvent, and quasi-one dimensional, and quasi-two-dimensional materials, such as graphitic material, glass flakes, and mica. In one aspect of the present teachings, the graphitic materials can be CNTs or graphene. Sacrificial metal particles may be nickel, zinc, aluminum, or magnesium, or alloys containing these metals. These particles may be spherical or essentially 2D flakes. These are non-limiting examples. All particles and materials may be functionalized so that they bind with the polymer matrix, other particles, or the substrate.

The polymer may be polyacrylate, polycarbonate, or polystyrene. The monomer may be bisphenol A diglycidyl ether (BPDGE), Novolac (polymer of BPDGE and formaldehyde), SU-8 (cyclic tetramer of BPDGE and formaldehyde, available from MicroChem® of Massachusetts), or any hydrogenated or fluorinated form of these. These are non-limiting examples, and numerous other di- and polyepoxies are known in the art. The thixotropic agents may be diamines, dithiols, amino thiols, carboxylic anhydrides, diphenols, or Mannich curing agents. These may also contain more than two functional groups. Specific, non-limiting examples are 1,4-diaminobutane, 1,3-diamino-1-methyl cyclohexane, 1,3-di(aminomethylene)benzene, and diamino polyethyleneoxide.

Polyurethanes, polyurethane-ureas, or polyureas may be fabricated from diisocyanates, polyisocyanates, polyols, or polyamines. Polyisocyanates include, but are not limited to ethylene diisocyanate, 1,2-propylene diisocyanate, cyclohexane-1,3-diisocyanate, 4,4'-dicycloheylmethane diisocyanate, toluene diisocyanate, m-phenylene diisocyanate, 3,3'-dimethyl-4,4'-biphenylene diisocyanate, and naphthalene diisocyanate. Diisocyanates may be modified by carbodiimide. Polyols may be, for example, ethylene glycol, glycerol, polyester polyols, polycaprolactone polyols, polycarbonate polyols, polyethylene glycol, or polypropylene glycol.

One-dimensional and two-dimensional materials are used to adjust viscosity, along with the proper choice of solvent, so that the material can be easily applied, but does not sag while the solvent evaporates. One-dimensional and two-dimensional materials have a low theoretical percolation threshold, between about 0.01 vol % to about 2 vol %, while spherical three-dimensional particles have a percolation threshold of about 30 vol %. These values may be obtained if the dispersion of the particles is perfect. However, many of these particles may aggregate, so that the percolation threshold may be much bigger, for example, about 0.1 vol % to about 20 vol % for quasi-one-dimensional and quasi-two-dimensional particles. Low percolation threshold is the reason why quasi-one-dimensional and quasi-two-dimensional particles are well suited for the control of viscosity, preventing sagging, and preventing the mixing of the layers. In one aspect of the present teachings, quasi-one dimensional particles can have a concentration between about 0.1 to about 2 wt % (inclusive), quasi-two dimensional particles can have a concentration between about 2 to about 20 wt % (inclusive), and three dimensional particles can have a concentration between about 50 to about 80 wt % (inclusive).

The composition may be adjusted so that the percolation threshold is not reached when a solvent is present, but is reached when the solvent even partially evaporates. When the particles form a continuous network, the viscosity may increase suddenly and significantly (more than 50%), and there will be no sagging, even when a second wet layer is applied on the top of the first wet layer. The increase of the viscosity may be much more than 50%.

Figure 3:
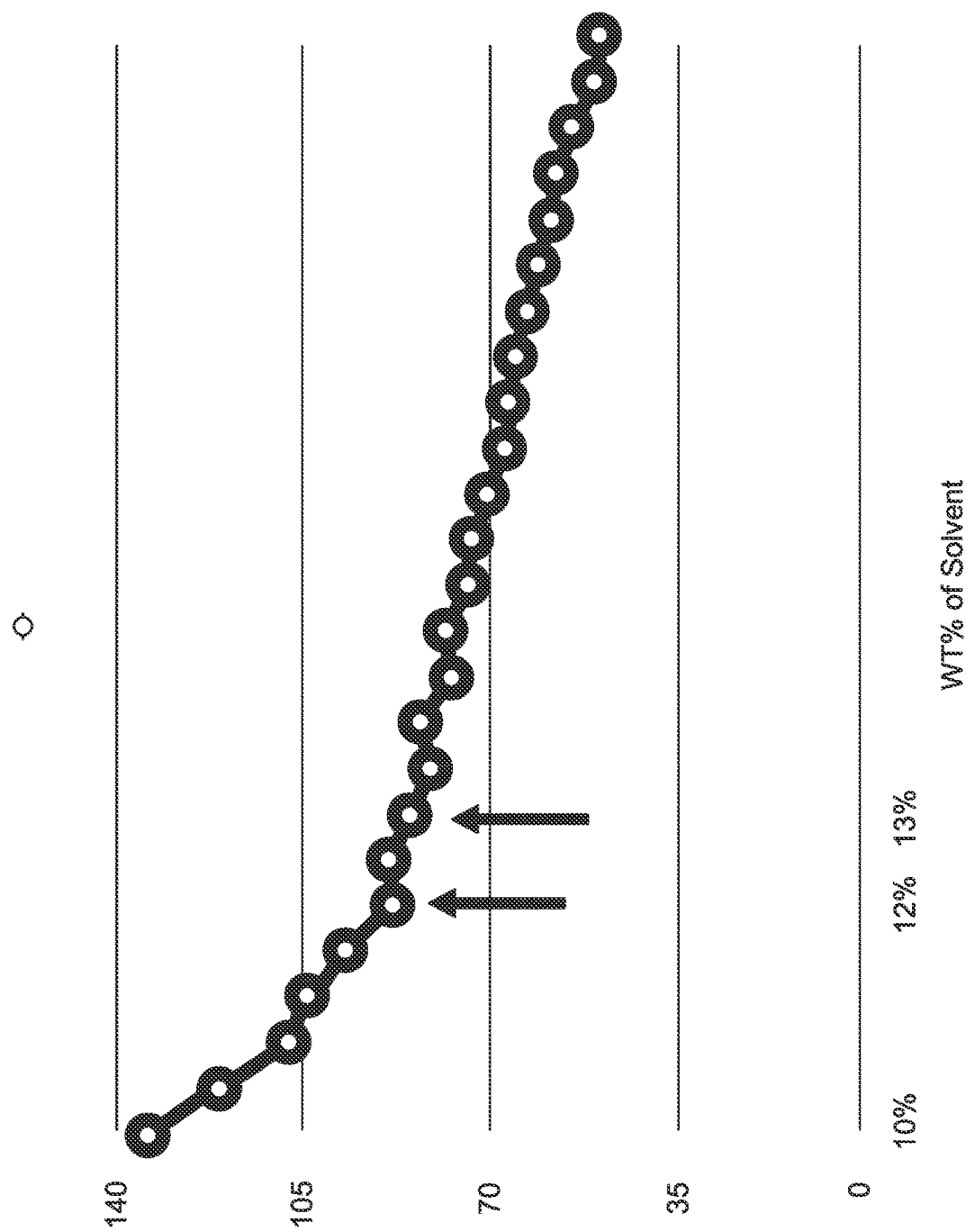
FIG. 3 shows the experimental viscosity (in KU units) of a coating material of Example 2, when solvent (VOC) is added in small portions.
Figure 4:
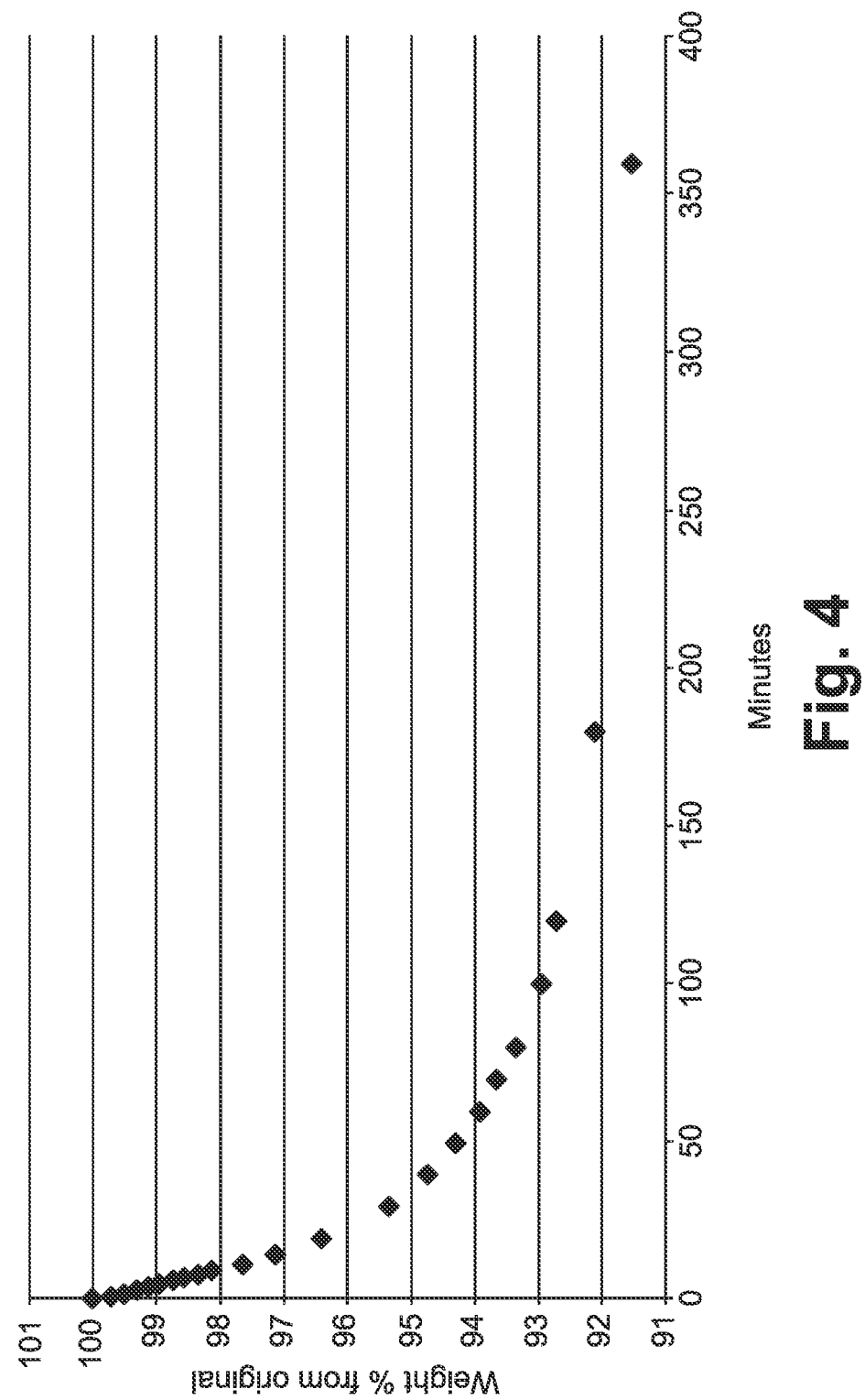
FIG. 4. Evaporation of the solvent from 125 micrometers thick layer of material of Example 1.

FIG. 3 shows the viscosity of the primer (Example 2) as a function of the solvent concentration. The material of the Example 2 is denoted by an arrow, i.e., this material contains 13 wt % of solvent. FIG. 4 shows the relative weight of 5 mil thick coating on 4"×4" steel plate as a function of time. At the beginning the weight is 100 wt % but decreases fast. In about 20 minutes the weight is 97% of the original (3% of the solvent has evaporated), and after six hours (360 minutes) about 8.5 wt % of total coating has evaporated. Because there is about 13 wt % of the solvent at the beginning in the coating, and percolation threshold is at 12% of the solvent, the percolation threshold will be reached when 3% of the weight is lost. This will take less than 20 minutes according to FIG. 4. In FIG. 4 the time axis is only 6-7 hours, but it can be estimated that all solvent has essentially evaporated in 10 hours, and maximum viscosity is reached.

FIG. 4 depicts the viscosity of the coating material of Example 2 as a function of added solvent (VOC). Diamond symbols represent measured values, and squares are linear least squares fit. As can be seen in FIG. 4, the viscosity first decreases very fast, with the slope of −415 cP/1% VOC. At around 13% VOC the slope changes to −93 cP/1% VOC. Thus, the slope is 4.5 times greater when the percolation threshold has been reached.

EXAMPLES

Example 1

Multiwalled carbon nanotubes (25 g) and nanographite (25 g) were dispersed into 5 kg of Epon™ 828 (an undiluted clear difunctional bisphenol A/epichlorohydrin derived liquid epoxy resin) using a high speed (10,000 rpm) blade mixer. Mixing was continued and 7.5 kg of zinc powder was added. Finally, 0.4 kg t-butyl acetate, 0.5 kg petroleum spirits, and 1.2 kg xylene were added. Four kilograms of this mixture was mixed with 0.38 kg of Ancamide® 702B75 (a low viscosity, solvent based polyamide adduct curing agent, supplied at 75% solids in n-butanol). This mixture is the coating material for the first layer (primer) in Example 4 and was used immediately after fabrication.

Example 2

Multiwalled carbon nanotubes (25 g) and nanographite (25 g) were dispersed into 5 kg of Epon™ 828 using high speed (10,000 rpm) blade mixer. Mixing was continued, and 7.5 kg of zinc powder was added. Finally, 0.3 kg t-butyl acetate, 0.3 kg petroleum spirits, and 0.8 kg xylene was added. Five kilograms of this mixture was mixed with 0.50 kg of Ancamide® 702B75 (Airproducts). t-Butyl acetate/Xylene 3:4 mixture was added in measured portions (between about 25 g and about 100 g), and the viscosity was measured after each addition. The result is shown in FIG. 3.

Example 3

The 5 g sample of the mixture of Example 1 was spread on a 4"×4" substrate using a 5 mil drawdown bar. The total weight of the substrate and coating was measured every minute for the first ten minutes, then every five minutes for the next twenty minutes, then every ten minutes for the next thirty minutes, then hourly for the next five hours, and then daily. The result of the first 6 hours is shown in FIG. 4.

Example 4

100 g of t-butyl acetate and 120 g Hi Sol® 10 (a naphthenic aromatic solvent) were added to 1 kg of Epon™ 828. Similarly, 125 g of t-butyl acetate, and 150 g Hi Sol® 10 were added into 1.05 kg of Aradur® 283 (a formulated polyamidoamine hardener). Both mixtures were mixed with each other, and the final mixture constitutes the coating material for the second layer (topcoat) in Example 3, and was used immediately after fabrication.

Example 5

The mixture of Example 1 was sprayed with a Binks® Trophy Series II2GX paint gun using a Binks® 1.4 liquid nozzle tip, an LVMP air tip, and a Binks® 1.5-gal pressure pot. Steel substrates were 10 cm×20 cm and were sandblasted to SP10 standard (near-white metal blast cleaning from Society for Protective Coatings). A 200 µm thick layer was sprayed on these panels in a vertical position. The solvent was allowed to evaporate for 20 minutes, and the second epoxy layer was sprayed on using the material of Example 2 with the same equipment, but using a 1.0 liquid tip, and an HVLP air tip. The thickness of the second layer (top coat) was 150 µm. The coating was allowed to cure one week. Adhesion was tested using a PosiTest AT-A (DeFelsko) adhesion meter, and the result was 2240 psi.

Example 6

The primer of Example 1 was mixed with Ancamide 2767 in the ratio 10:1. This mixture contains 75 wt % Zn calculated of solids, and 2 wt % of MWNTs of epoxy. Solvents comprise about 13 wt % of the total. About a 5 mil to about a 12 mil (125 to 300 micrometers) layer of this mixture was sprayed using a cup gun (3M Accuspray gun) with 1.8 mm nozzle. After 10 to 30 minutes of drying the epoxy topcoat containing 1 wt % CNTs was sprayed similarly. When the total wet coat was 20 mil, no sagging was observed. After curing at ambient temperature for one week there was no amine blush, blisters, or mud cracking observed.

The material of Example 1 is representative of the present teachings. It contains 13.2% solvents (VOC). The freshly fabricated material of Example 2 contains 9.4% solvents. This material was used for the viscosity studies depicted in FIG. 3. These materials are denoted as E1 and E2 in FIG. 3. The dotted line represents the percolation threshold at 13% solvents.

Another aspect of the present teachings is the proper choice of solvents. Low boiling point solvents are used, which evaporate quickly after the paint is applied to the substrate. On the other hand, the solvents should not interfere with the curing process. Thus, in one aspect of the present teachings, no ketones are used. Alkanes, ethers, and esters may have low boiling points. These include hexane, cyclohexane, diethyl ether, ethyl propyl ether, ethyl acetate, and t-butyl acetate. When health effects and commercial availability are included, hexane, cyclohexane, a mixture of aliphatic hydrocarbons (mineral spirits or petroleum ether), or t-butyl acetate are chosen. When used with resins and curing agents, additional solvents, such as aromatic hydrocarbons or high boiling ethers, such as ethylene glycol, diethylene glycol dimethyl ether, or dimethyl phthalate may be used.

The material of Example 1 was applied to the surface, as explained in Example 3. The evaporation of the solvent was measured for several hours. The evaporation was very fast in the beginning (see FIG. 3). Almost 30% of the solvent evaporated within the first fifteen minutes, and almost half evaporated within thirty minutes.

When the material E1 is applied on a surface, for example a 125 µm layer, the solvent starts to evaporate. During the first minute, the solvent concentration drops below 13%, i.e., the percolation threshold is reached within one minute. After 28 minutes the solvent concentration is about 9%, i.e., an additional 4% of the solvent has evaporated, and the composition E2 is reached. On average, an additional 1% of the solvent will be evaporated in 7 minutes, and the viscosity will increase at the same time to 415 cP. This immediate and fast increase of the viscosity enables the WoW method of the present teachings.

Graphitic material may be SWNTs, DWNTs, MWNTs, monolayer or multilayer graphene, graphite, or functionalized forms of these. Graphitic material may be dispersed into any polymeric component, or into all of them, for example, into both epoxy and amine. Dispersion methods include mechanical mixing, such as milling, high speed blades, ball milling, ultrasonic mixing, or hydrodynamic injection. Graphitic material may be exfoliated and cut during dispersion and may be chemically bound with a monomer or polymer simultaneously, especially in the presence of catalysts. The concentration of the CNTs may be between about 0.05 vol % and about 5 vol %, or in another aspect of the present teachings, between about 0.2 vol % and about 1.5 vol %, and the concentration of graphene, or graphite, may be between about 1 vol % and about 20 vol %.

Glass flakes may be used to increase viscosity and reduce the mixing of the consecutive coating layers during and after the application. The barrier properties of the cured coating will also be improved. Glass flakes may be silyl coated. Mica flakes may be similarly used. The amount of glass or mica flakes may be between about 1 vol % and about 40 vol %, or in another aspect of the present teachings between about 10 vol % and about 30 vol %.

The primer may contain sacrificial metal particles, including aluminum, magnesium, zinc, titanium, iron, and nickel. Sacrificial metal should be less noble than the substrate (i.e. the sacrificial metal has a lower reduction potential than the substrate). These particles may be nearly spherical or platelets, and in some cases may be rods. Sacrificial metal particles may have a concentration between about 10% and about 75%. If the sacrificial metal particles are flakes, their concentration can be between about 10% and about 50%.

One method to reduce the viscosity of a coating material is to add solvent that has a low enough boiling point, such as methyl ethyl ketone, n-butyl acetate, t-butyl acetate, alkanes, or arylalkanes, such as octane, nonane, decane, toluene, or xylene that have boiling points below 200° C. The amount of volatile organic compounds (VOC) should be kept as low as possible, and in one aspect of the present teachings, the VOC are below 25%.

The coating material may be applied by any painting method, including brush, roller, spraying, and soaking. Spraying may be air pressure powered, airless, plural spray, ultrasonic spray, or some other spray. The mixture may be heated or cooled during spraying. The spraying method chosen sets some limits for the viscosity, mainly so that viscosity is not too high, i.e., the concentration of the components in the paint should not exceed the percolation threshold.

Most of the solvent will evaporate in less than one hour, and possibly within 15-30 minutes. Curing will start immediately after mixing, but full cure may take several days. The surface may appear dry after several hours and is suitable for conventional WoD application. However, in many cases it is not possible to apply the first and second layer during the same day using the conventional WoD method. The coating materials and methods of the present teachings allow the application of the second layer as soon as most of the solvent has evaporated from the first layer, i.e., when the first layer is still wet. This WoW method will allow coating of the substrate with two or more layers within one day. This will significantly reduce the cost of coating. Also, bonding of the layers may be stronger than in conventional WoD coating.

Mixing of the consecutive layers may be reduced, and essentially avoided, if polarities of the mixtures are different. This may be achieved by making the first mixture essentially aliphatic, and the second essentially aromatic. Still another differentiation may be achieved by using fluorinated compounds that may be immiscible with both aliphatic and aromatic compounds. Also, the solvent may be chosen so that it is poorly miscible with the previous layer. Total immiscibility between consecutive layers is not necessary. Immiscibility may reverse mixing that may happen during spraying, or other coating method, so that the process resembles self-stratifying in the vicinity of the interface.

The primer and all intermediate layers have the composition of the present teachings when wet surfaces are coated. The topcoat may also have the composition of the present teachings, but that is not mandatory, because sagging and mixing of layers may not be problem.

In another aspect of the present teaching, after the anticorrosive coating is applied, a self-stratifying coating can be applied on top, creating a three layer coating.

Clause 1—A method of coating an associated substrate with an anticorrosive coating, the method includes applying a first curable liquid layer to the associated substrate, the first curable liquid layer having a thickness of at least about 100 micrometers, wherein the first curable layer includes at least one polymer or at least one monomer, quasi-one-dimensional particles or quasi-two-dimensional particles, sacrificial metal particles, and a solvent, wherein a percolation threshold of the quasi-one-dimensional particles or the quasi-two-dimensional particles is not reached in the presence of the solvent, wherein the percolation threshold of the quasi-one-dimensional particles or the quasi-two-dimensional particles is reached when between about 1% and about 20% of the solvent evaporates, and applying a second curable liquid layer having a thickness of at least 100 micrometers on the top of the first curable liquid layer after the percolation threshold of the quasi-one-dimensional particles or the quasi-two-dimensional particles is reached and viscosity of the first curable liquid layer increases more than 50%.

Clause 2—The method of clause 1, wherein the method further includes allowing the first curable liquid layer and the second curable liquid layer to cure simultaneously.

Clause 3—The method of clauses 1 or 2, wherein the at least one monomer is at least two monomers, wherein one of the at least two monomers contains at least two epoxy groups, wherein one of the at least two monomers contains carboxylic anhydride, wherein one of the at least two monomers contains any combination of the following: amino, thiol, phenolic hydroxyl.

Clause 4—The method of clauses 1-3, wherein the coating absorbs substantially no water or carbon dioxide, and wherein the polymer will be continuous without any interface.

Clause 5—The method of clauses 1-4, wherein the first curable liquid layer contains quasi-one-dimensional particles and quasi-two-dimensional particles.

Clause 6—The method of clauses 1-5, wherein the quasi-one-dimensional particles have a concentration between about 0.1 weight percent and about 2.0 weight percent, and the quasi-two-dimensional particles have a concentration between about 2.0 weight percent and about 20 weight percent.

Clause 7—The method of clauses 1-6, wherein the at least one polymer forms polyurethane, polyurea, or a mixture of the two, when allowed to cure.

Clause 8—The method of clauses 1-7, wherein the quasi-one-dimensional particles or quasi-two-dimensional particles are chosen from graphitic particles, carbon nanotubes, graphene, glass flakes, or mica, wherein the solvent contains methyl ethyl ketone, t-butyl acetate, xylene, aliphatic hydrocarbons, including hexane, octane, nonane, or decane, wherein the method avoids amine blush or bloom.

Clause 9—The method of clauses 1-8, wherein the coating can be applied in less than twenty-four hours.

Clause 10—The method of clauses 1-9, wherein the method contains no washing or sanding of the first curable liquid layer.

Clause 11—The method of clauses 1-10, wherein the quasi-one-dimensional particles or quasi-two-dimensional particles are functionalized.

Clause 12—The method of clauses 1-11, wherein the solvent has a boiling point less than 200° C.

Clause 13—The method of clauses 1-12, wherein no ketones are used.

Clause 14—The method of clauses 1-13, wherein the quasi-one-dimensional particles or quasi-two-dimensional particles are graphitic material, wherein the graphitic material is exfoliated, cut during dispersion, and chemically bound to the at least one polymer or at least one monomer.

Clause 15—The method of clauses 1-13, wherein the quasi-one-dimensional particles or quasi-two-dimensional particles are glass flakes, wherein the glass flakes are silyl coated.

Clause 16—The method of clauses 1-15, wherein volatile organic compounds are less than 25 weight percent in the coating.

Clause 17—The method of clauses 1-16, wherein the second curable liquid layer includes at least one polymer or at least one monomer, sacrificial metal particles, and a solvent.

Clause 18—An anticorrosive-coated substrate including a first curable liquid layer applied to the substrate, the first curable liquid layer having a thickness of at least about 100 micrometers, wherein the first curable layer includes at least one polymer or at least one monomer, quasi-one-dimensional particles or quasi-two-dimensional particles, sacrificial metal particles, and a solvent, a second curable liquid layer having a thickness of at least 100 micrometers on top of the first curable liquid layer, wherein a percolation threshold of the quasi-one-dimensional particles or the quasi-two-dimensional particles is reached, wherein the first curable liquid layer and the second curable liquid were cured simultaneously.

Clause 19—The substrate of clause 18, wherein the at least one monomer is at least two monomers, wherein one of the at least two monomers contains at least two epoxy groups, wherein one of the at least two monomers contains carboxylic anhydride, wherein one of the at least two monomers contains any combination of the following: amino, thiol, phenolic hydroxyl.

Clause 20—The substrate of clauses 18 or 19, wherein the at least one polymer forms polyurethane, polyurea, or a mixture of the two, when allowed to cure, wherein the quasi-one-dimensional particles or quasi-two-dimensional particles are chosen from graphitic particles, carbon nanotubes, graphene, glass flakes, or mica, wherein the solvent contains methyl ethyl ketone, t-butyl acetate, xylene, aliphatic hydrocarbons, including hexane, octane, nonane, or decane.

Clause 21—A self-stratifying anticorrosive coating includes a zinc-rich epoxy, a curing agent chosen from the group consisting of amines, thiols, phenols, and carboxylic anhydrides, a binding agent chosen from the group consisting of aminoalkyl dialkoxysilane, dimethoxysilane, and aminoalkyl trialkoxysilane, a graphitic material, a solvent, and a water scavenger.

Clause 22—A self-stratifying anticorrosive coating includes sacrificial metal particles, graphitic material, a first monomer, at least a second monomer or at least a first polymer, and a material that prevents the polymerization of at least one monomer inside the coating.

Clause 23—The coating of clause 22 further includes a curing agent and a binding agent.

Clause 24—The coating of clauses 22 or 23, wherein the at least two different monomers or polymers are chosen from the group consisting of epoxies, polyurethane, acrylates, methacrylates, vinyl ethers, cycloaliphatic epoxides, oxetanes, epoxides, photopolymers, siloxanes, and polyurea.

Clause 25—The coating of clauses 22-24, wherein the graphitic material is chosen from the group consisting of single walled carbon nanotubes, double walled carbon nanotubes, multiwalled carbon nanotubes, single sheet graphene, double sheet graphene, or multi-sheet graphene.

Clause 26—The coating of clauses 22-25, wherein the material that prevents the polymerization of at least one monomer inside the coating is a water scavenger chosen from the group consisting of liquid water scavengers, molecular sieves, silica, metal salts, and metal oxides.

Clause 27—The coating of clauses 22-26, wherein the sacrificial metal particles are chosen from the group consisting of any metal that has more positive redox potential then iron.

Clause 28—The coating of clauses 22-27, wherein the sacrificial metal particles are chosen from the group consisting of zinc, magnesium, aluminum, and alloys thereof.

Clause 29—The coating of clauses 22-28, wherein the curing agent is chosen from the group consisting of amines, thiols, phenols, and carboxylic anhydrides, and the binding agent is chosen from the group consisting of silanes with at least two alkyl groups. As a non-limiting example, aminoalkyl dialkoxysilane, dimethoxysilane, and aminoalkyl trialkoxysilane.

Clause 30—The coating of clauses 22-29, wherein the coating further comprises a photoinitiator chosen from the group consisting of 1-hydroxy-cyclohexyl-phenyl-ketone, 2-hydroxy-1-[4-(2-hydroxyethoxy)phenyl]-2-methyl-1-propanone, 2,2-dimethoxy-2-phenylacetophenone, Bis(2,4,6-trimethylbenzoyl)-phenylphosphine oxide, triphenyl sulfonium triflate, triaryl sulfonium hexafluoroantimonate salts, triaryl sulfonium hexafluorophosphate salts, bis(eta 5-2,4-cyclopentadien-1-yl)-bis(2,6-difluoro-3-(1H-pyrrol-1-yl)-phenyl)titanium, 5,7-diiodo-3-butoxy-6-fluorone, 2,4,5,7-tetraiodo-3-hydroxy-6-fluorone, and 2,4,5,7-tetraiodo-3-hydroxy-9-cyano-6-fluorone.

Clause 31—A method for a self-stratifying anticorrosive coating on an associated substrate including the steps of mixing together a monomer or a polymer, a solvent, a graphitic material, and sacrificial metal particles, adding a material that prevents polymerization inside the coating before, and immediately after application on the associated substrate, adding a silane mixture.

Clause 32—The method of clause 31 further comprising the steps of adding a curing agent and applying, in one spraying, the mixture of the monomer or polymer, the solvent, the graphitic material, and the sacrificial metal particles, the silane mixture, and the curing agent to the associated substrate, wherein an external effector hydrolyzes the silane mixture creating silicic acid, wherein the silicic acid spontaneously polymerizes into siloxane.

Clause 33—The method of clauses 31 or 32, wherein no insulating layer is used.

Clause 34—The method of clauses 31-33 wherein the external effector is ambient moisture or photons.

Clause 35—The method of clauses 31-34, wherein the monomer or polymer is chosen from the group consisting of epoxies, acrylates, methacrylates, vinyl ethers, cycloaliphatic epoxides, oxetanes, epoxides, photopolymers, siloxanes, and polyurea.

Clause 36—The method of clauses 31-35, wherein the graphitic material is chosen from the group consisting of single walled carbon nanotubes, double walled carbon nanotubes, multiwalled carbon nanotubes, single sheet graphene, double sheet graphene, or multi-sheet graphene.

Clause 37—The method of clauses 31-36, wherein the material that prevents the polymerization inside the coating is a water scavenger chosen from the group consisting of liquid water scavengers, molecular sieves, silica, metal salts, and metal oxides.

Clause 38—The method of clauses 31-37, wherein the sacrificial metal particles are chosen from the group consisting of any metal that has more positive redox potential then iron.

Clause 39—The method of clauses 31-38, wherein the sacrificial metal particles are chosen from the group consisting of zinc, magnesium, aluminum, and alloys thereof.

Clause 40—The method of clauses 31-39, wherein the coating further comprises a photoinitiator chosen from the group consisting of 1-hydroxy-cyclohexyl-phenyl-ketone, 2-hydroxy-1-[4-(2-hydroxyethoxy)phenyl]-2-methyl-1-propanone, 2,2-dimethoxy-2-phenylacetophenone, Bis(2,4,6-trimethylbenzoyl)-phenylphosphine oxide, triphenyl sulfonium triflate, triaryl sulfonium hexafluoroantimonate salts, triaryl sulfonium hexafluorophosphate salts, bis(eta 5-2,4-cyclopentadien-1-yl)-bis(2,6-difluoro-3-(1H-pyrrol-1-yl)-phenyl)titanium, 5,7-diiodo-3-butoxy-6-fluorone, 2,4,5,7-tetraiodo-3-hydroxy-6-fluorone, and 2,4,5,7-tetraiodo-3- hydroxy-9-cyano-6-fluorone, wherein the curing agent is chosen from the group consisting of amines, thiols, phenols, and carboxylic anhydrides, and the binding agent is chosen from the group consisting of aminoalkyl dialkoxysilane, dimethoxysilane, and aminoalkyl trialkoxysilane.

The various aspects have been described, hereinabove. It will be apparent to those skilled in the art that the above methods and apparatuses may incorporate changes and modifications without departing from the general scope of the present teachings. It is intended to include all such modifications and alterations insofar as they come within the scope of the appended claims or the equivalents thereof. Although the description above contains much specificity, this should not be construed as limiting the scope of the present teachings, but as merely providing illustrations of some of the aspects of the present teachings. Various other aspects and ramifications are possible within its scope.

Furthermore, notwithstanding that the numerical ranges and parameters setting forth the broad scope of the present teachings are approximations, the numerical values set forth in the specific examples are reported as precisely as possible. Any numerical value, however, inherently contain certain errors necessarily resulting from the standard deviation found in their respective testing measurements.

The invention claimed is:

1. A method of coating an associated substrate with an anticorrosive coating, the method comprising the steps of:
   first, applying a first curable liquid layer to the substrate, the first curable liquid layer having a thickness of at least about 100 micrometers, wherein the first curable layer comprises:
      at least one polymer or at least one monomer;
      quasi-one-dimensional particles or quasi-two-dimensional particles;
      sacrificial metal particles; and
      a solvent, wherein a percolation threshold of the quasi-one-dimensional or the quasi-two-dimensional particles is not reached in the first curable liquid layer in the presence of the solvent;
   second, evaporating at least enough of the solvent to reach the percolation threshold of the quasi-one-dimensional or the quasi-two-dimensional particles, thereby creating a modified first curable liquid layer;
   third, applying a second curable liquid layer having a thickness of at least 100 micrometers on top of the modified first curable liquid layer, wherein the modified first curable liquid layer and the second curable liquid layer are cured simultaneously.

2. The method of claim 1, wherein the at least one monomer is at least two monomers, wherein one of the at least two monomers contains at least two epoxy groups, wherein one of the at least two monomers contains carboxylic anhydride, wherein one of the at least two monomers contains any combination of the following: amino, thiol, phenolic hydroxyl.

3. The method of claim 1, wherein the anticorrosive coating absorbs substantially no water or carbon dioxide.

4. The method of claim 1, wherein the first curable liquid layer contains quasi-one-dimensional particles and quasi-two-dimensional particles.

5. The method of claim 4, wherein the quasi-one-dimensional particles have a concentration between about 0.1 weight percent and about 2.0 weight percent in the first curable liquid layer, and the quasi-two-dimensional particles have a concentration between about 2.0 weight percent and about 20 weight percent in the first curable liquid layer.

6. The method of claim 1, wherein the at least one polymer forms polyurethane, polyurea, or a mixture of the two, when allowed to cure.

7. The method of claim 1, wherein the quasi-one-dimensional particles or quasi-two-dimensional particles are chosen from graphitic particles, carbon nanotubes, graphene, glass flakes, or mica, wherein the solvent contains methyl ethyl ketone, t-butyl acetate, xylene, or aliphatic hydrocarbons, wherein the method avoids amine blush or bloom.

8. The method of claim 7, wherein the quasi-one-dimensional particles or quasi-two-dimensional particles are graphitic material; and wherein the aliphatic hydrocarbon is chosen from hexane, octane, nonane, or decane.

9. The method of claim 8, wherein the graphitic material is exfoliated, cut during dispersion, and chemically bound to the at least one polymer or at least one monomer.

10. The method of claim 7, wherein the quasi-one-dimensional particles or quasi-two-dimensional particles are glass flakes, wherein the glass flakes are silyl coated.

11. The method of claim 1, wherein the quasi-one-dimensional particles or quasi-two-dimensional particles are functionalized.

12. The method of claim 1, wherein the solvent has a boiling point less than 200° C.

13. The method of claim 1, wherein no ketones are used.

14. The method of claim 1, wherein volatile organic compounds are less than 25 weight percent in the anticorrosive coating.

15. The method of claim 1, wherein the second curable liquid layer comprises:
   at least one polymer or at least one monomer;
   sacrificial metal particles; and
   a solvent.

* * * * *